Jan. 7, 1930.　　　G. S. EBLE　　　1,742,307

VALVE

Filed Nov. 10, 1924　　　3 Sheets-Sheet 1

INVENTOR
GROVER S. EBLE
BY
ATTORNEYS

Jan. 7, 1930. G. S. EBLE 1,742,307
VALVE
Filed Nov. 10, 1924   3 Sheets-Sheet 2
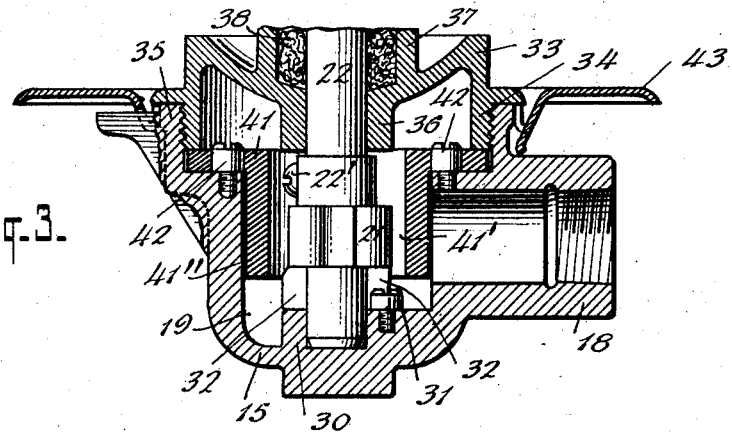
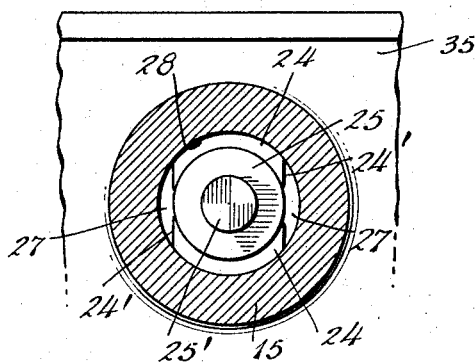
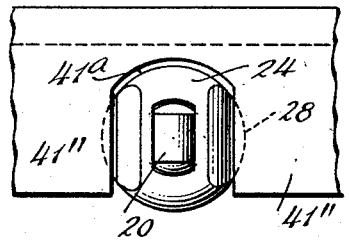
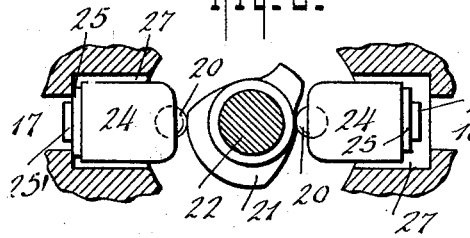
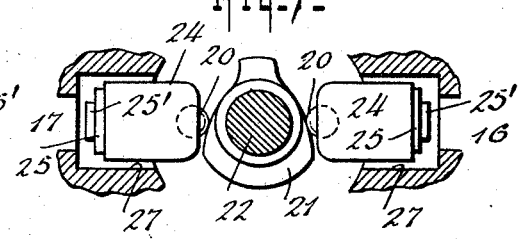
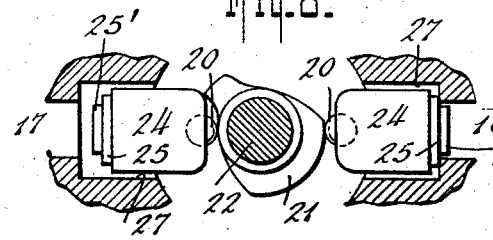
INVENTOR
GROVER S. EBLE
BY
ATTORNEYS

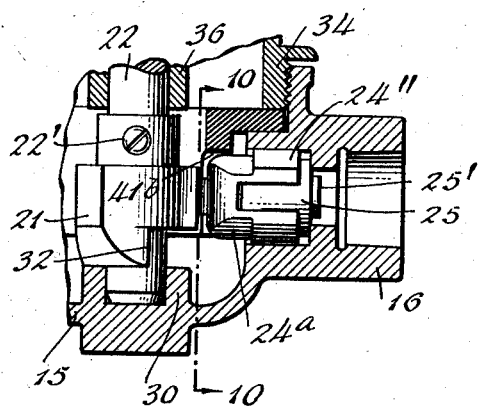
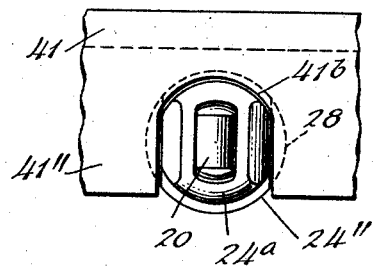
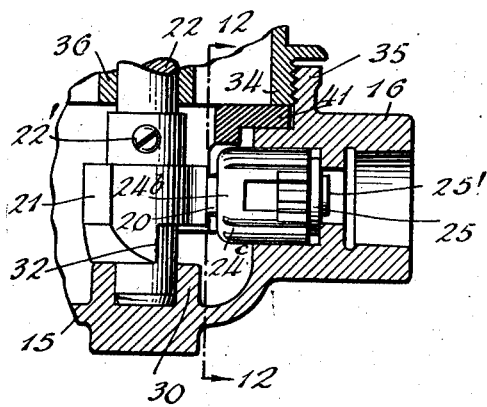
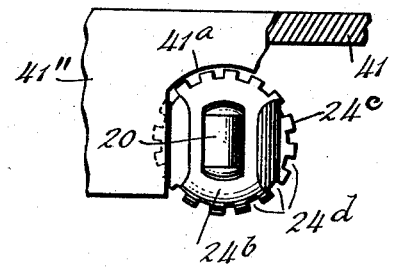
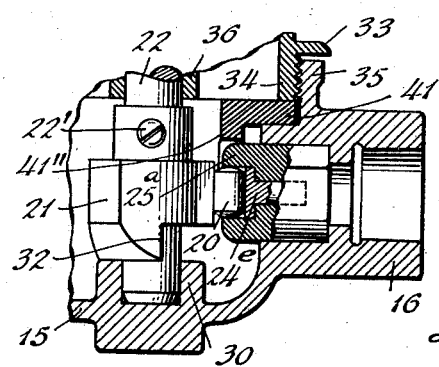

Patented Jan. 7, 1930

1,742,307

UNITED STATES PATENT OFFICE

GROVER S. EBLE, OF NEW YORK, N. Y.

VALVE

Application filed November 10, 1924. Serial No. 748,849.

My invention relates to valves for controlling and regulating the passage of fluids, and has been designed particularly for use on mixing valves having inlets for two kinds of fluids (for instance, hot and cold water) and an outlet through which either one of these fluids, or a mixture of both, may be discharged. My present invention effects improvements as regards simplicity of construction and reliableness in operation, together with ease in removing and replacing parts, and adjusting them to their proper positions. These and other advantages of my invention will appear more clearly from the detailed description following hereinafter.

Figure 1:
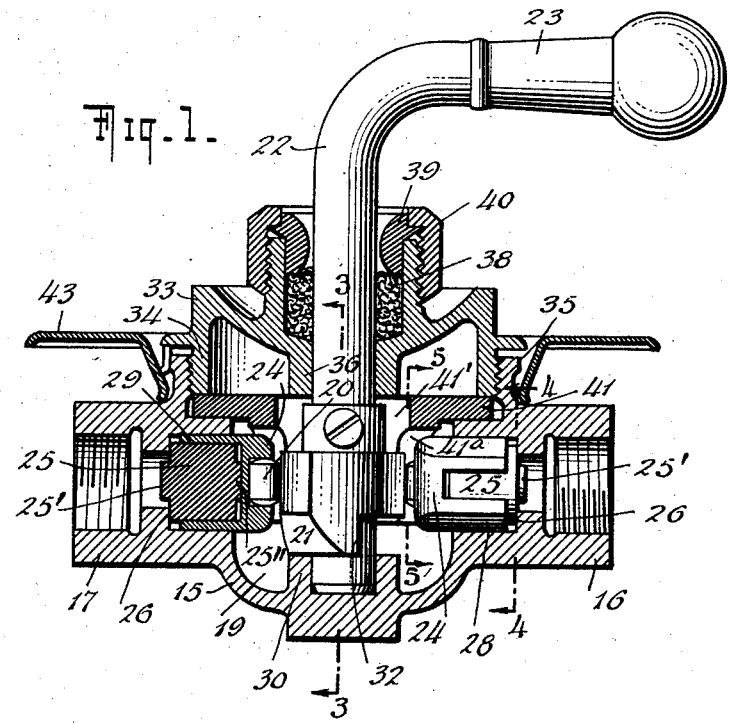
Figure 2:
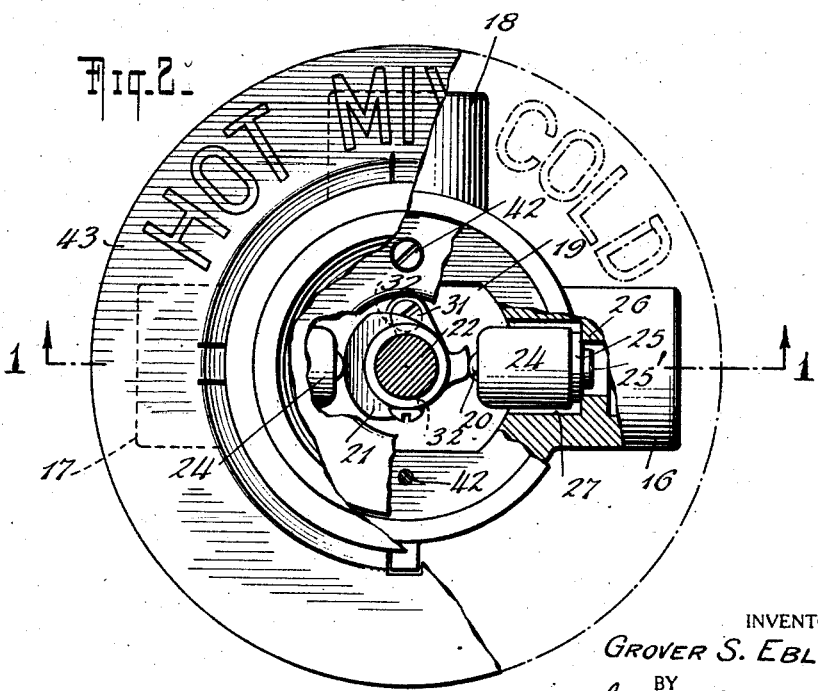

Two satisfactory embodiments of the invention are shown, as examples, in the accompanying drawings, in which Fig. 1 is an axial section on line 1—1 of Fig. 2, the latter being a plan view, with some parts removed and others in section; Figs. 3, 4 and 5 are views substantially on the correspondingly-numbered lines of Fig. 1; Figs. 1 to 5 show the valve in the closed position; Figs. 6, 7 and 8 and diagrammatic sectional plans showing a controlling cam and the valves proper operated thereby, in three different positions, Fig. 6 indicating only one valve as open (say, to deliver cold water), while in Fig. 7 both valves are open (mixing position) and in Fig. 8 only the other valve (for hot water) is open; Fig. 9 is a sectional view, similar to the right hand portion of Fig. 1, showing another construction of the valve proper; Fig. 10 is a fragmentary view on line 10—10 of Fig. 9; Figs. 11 and 13 are views similar to Fig. 9 showing two further constructions; and Fig. 12 is a section on line 12—12 of Fig. 11.

The valve casing comprises two members which for the sake of convenience are referred to as the upper member and the lower member, although it will be understood that the valve may be used in any position. The lower member 15 is shown as made with three connections or spuds one of which, for instance 16, is adapted to serve as an inlet for cold water, another, 17, (diametrically opposite) as a hot-water inlet, and the third, 18, as an outlet in permanent communication with the central chamber 19 into which hot or cold water is admitted from said inlets when the respective individual valves are open, as will be explained below.

In Figs. 1 to 8 inclusive, the construction of these individual valves is as follows: Each of these valves comprises three members, viz: first, a roller 20, the axis of which is shown parallel to the axis of the cam 21 fastened to the spindle 22 which is provided with a handle 23; second, a metallic bearing member 24 engaging said roller on the side opposite to the cam; and third, an elastic member or cushion 25 which on one side engages said bearing member and on the other side is adapted to become seated on a suitable ledge or shoulder 26 in the inlet 16 or 17. As shown in Figs. 2 and 4, the bearing member 24 is so shaped as to leave passages or channels 27 along its outer surface, to enable water to pass from the inlet 16 or 17 to the central chamber 19, unless the valve is closed by the cam pressing the outer end of the member 25 against the shoulder or seat 26. Said bearing member is in sliding engagement with a guide-way 28 of the lower member 15, and is made with an outwardly-open cylindrical chamber or socket 29 in which is held removably, the elastic member 25 (made as a rubber plug). I prefer to make this member, at its opposite ends, with two central projections 25′ and 25″ one of which engages the transverse wall of the socket 29, while the other extends into the water passage, exteriorly of the valve seat 26. These two projections are made of different lengths. The plug 25 may be readily removed from the socket 29, and reversed end to end, so as to bring either the projection 25′ or the projection 25″ against the transverse wall of the socket 29. Such reversal will alter the distance existing, in the closed position of the valve, between the seat 26 and the transverse wall of the socket 29. A better fit may thus be obtained, since reversal of the plug 25 means, in effect, adjusting the bearing member 24 toward or from the valve seat 26, in the closed position of the valve. Also, if initially the smaller or shorter projection 25″ is placed within the socket, and such projection becomes shortened by compression and wear, so that the valve will no longer close properly, reversal of the plug 25 will bring the longer projection 25′ into operative engagement with the transverse wall of the socket 29, and as this longer projection up to that time has not been subjected to compression or wear, it retains its original length, and will thus restore the original position of the parts. Preferably, the projection 25′ is made about twice as long as the projection 25″. The roller 20 is preferably made with spherically rounded ends, and is set in a recess of the bearing member 24, the edges of the recess being crimped on said rounded ends of the roller, so as to prevent it from leaving such recess.

The cam spindle 22 has its lower end fitted into a step bearing 30, to which is also secured a stop screw 31 (Figs. 2 and 3) adapted to engage diametrically aligning stop shoulders 32 on the cam 21. A set screw 22′ secures the cam on its spindle 22, and upon loosening this screw the cam can be adjusted circumferentially so as to bring it to the proper operative position.

The upper member or bonnet 33 of the casing is connected to the lower member 15 by means of a threaded portion 34 screwing into an upwardly-projecting flange 35 of said lower member. The cam spindle 22 is journaled in a sleeve bearing 36 of the bonnet and extends through a stuffing box 37 containing packing 38 and a gland 39. A nut 40 holds these parts in proper position.

The lower edge of the bonnet 33 engages and compresses an annular member or washer 41 having a central opening 41′ preferably of sufficient size to allow the cam 21 to be passed therethrough freely, this facilitating the assembly and taking apart of the device. The washer 41 is provided with a downwardly extending cylindrical flange 41″ around the opening 41′, and said flange is provided with arched cut out portions 41ª (Figs. 1 and 5) at diametrically opposite points, these portions straddling the inner ends of the inlet valves, at the flat faces 24′ of the bearing member 24. These flat faces in conjunction with the cut out portions 41ª constitute means for guiding the inlet valves so that in opening and closing they will move in straight lines, without turning on their axes. The washer 41 is held in proper position (even after removal of the bonnet 33, or before such bonnet is applied), in any suitable manner, for instance by two screws 42 arranged diametrically in line with the outlet 18 (see Figs. 2 and 3).

The inlet valves may be removed when desired, by moving them to the center of the chamber 19 and out through the opening 41′ after the bonnet 33 and the cam 21 with its spindle and handle have been withdrawn. It will be noted that the axes of the rollers 20 extend lengthwise of the cam spindle 22 and that they are parallel to the flat guiding surfaces 24′ of the inlet valves. The guiding surfaces formed by the arched cut out portions 41ª of the flange 41″ preferably extend to the bottom of the cam surface and almost to the bottom of the bearing members 24, or at least beyond the axes of the inlet valves, so that the latter are guided both above and below their axes.

The operation is as follows: In the shut position (which may be indicated by the position of the handle 23 relatively to a suitable stationary dial 43, as suggested in Fig. 2), the cam 21 stands in such a position (Figs. 1 and 2) as to close both valves controlling the inlets 16 and 17. By turning the spindle 22 in a contra-clockwise direction (so as to bring the shoulder 32 shown at the top in Fig. 2, away from the stop 31 which it engages in said shut position), the cold water inlet valve is caused to first open alone, under the influence of the water pressure. The resulting position, illustrated by Fig. 6, corresponds to the position of the handle 23 in registry with the legend Cold indicated in Fig. 2. The hot water inlet valve shown at the left remains closed. Continuing to turn the spindle 22 in the same direction the handle 23 will be brought into registry with the word Mix in Fig. 2, or to a position in the neighborhood of said word. In this position, both inlet valves will be allowed to open under the water pressure (Fig. 7) so that both hot and cold water will enter the main chamber of the valve casing and be discharged therefrom through the outlet 18. Finally, by swinging the handle 23 contra-clockwise to a position in which the other shoulder 32 engages the stop 31, the cam 21 will be brought to a position (Fig. 8) in which it will close the cold water inlet valve while leaving the hot water inlet valve open, so that at this time (handle 23 registering with the word Hot) only hot water will flow from the outlet 18.

Securing the cam 21 on its spindle in such a manner that (upon loosening the set screw 22′) the cam can be shifted circumferentially, also has the advantage that, upon reversing or turning the cam through an angle of 180°, the supply of hot water may be connected with the inlet 16, and that of cold water, with the inlet 17, without disturbing the relation of the handle 23 to the indications on the dial. Thus the hot water connection may be made either at the left or at the right of the valve casing as may be most convenient, thereby simplifying the piping and in certain relations avoiding the crossing of the cold water pipes with the hot water pipes, for instance when such pipes are connected with two or more mixing valves of the character described herein, mounted in gangs or back to back.

As shown in Figs. 1 and 4, the flat faces 24′ of the bearing member 24 may be slotted lengthwise so that the cushion 25 is exposed at these points and can be readily grasped to facilitate its insertion in, or removal from, the socket 29.

In Figs. 9 and 10, the bearing member 24″ is reduced in diameter at its inner end 24$^a$, thus forming a shoulder which is adapted to engage the upper edge of the corresponding arched portion 41$^b$ of the washer 41. The portion of the flange 41″ lying in the path of the large diameter outer portion of the bearing member 24″ will thus form a stop to prevent the inlet valve from moving inwardly far enough to become detached, since such outer portion cannot get past the upper edge of the arched portion 41$^b$. Both inlet valves (when constructed as shown in Figs. 9 and 10) may however be removed, if desired, by lifting out the washer 41 after the bonnet 33 and the cam 21 with its spindle and handle have been withdrawn.

In Figs. 11 and 12, the arched portion 41$^a$ of the flange 41″ is the same as in Figs. 1 and 5, and the bearing member 24$^b$ has longitudinal ribs 24$^c$ on its periphery, with grooves 24$^d$ between such ribs. These grooves form passages through which the liquid may flow, and therefore perform the same function as the channels 27 of Figs. 2 and 4. The inner portion of the bearing member has flattened surfaces (corresponding to 24′, Fig. 4) sliding along the vertical faces of the arched portion 41$^a$, so that the axis of the roller 20 will be kept vertical. The outermost portion of the bearing member, however, is not flattened, but of full diameter, so that upon removal of the cam 21 and its spindle 22, the inlet valves cannot drop out accidentally, since the portions of the flange 41″ at the sides of the opening 41$^a$ will form stops lying in the path of the full-diameter outer portion of the bearing member 24$^b$. However, if it is desired to remove the inlet valves, this can be done after withdrawing the washer 41, in a manner similar to that described in connection with Figs. 9 and 10.

It will be understood that while Figs. 9 to 12 (and Fig. 13 as well) illustrate the valve controlling the inlet 16, like constructions are to be employed, in each case, for the valve controlling the other inlet, 17.

It will also be understood that, in the constructions illustrated by Figs. 9 to 12, the resilient member or plug 25 is assumed to be like the one shown in Figs. 1, 2, 4, 6, 7 and 8, with projections 25′, 25″ at opposite ends.

In the construction shown in Fig. 13 the bearing member 24$^e$ is not in the nature of a socket guided in the valve casing and surrounding the resilient member or plug 25, but in the nature of a shank or stem embedded in the resilient member 25$^a$ and provided with an enlargement or head engaged by the roller 20. The inner end of the resilient member 25$^a$ has a socket large enough to receive not only the bearing member 24$^e$ but the roller 20 as well, the latter projecting slightly to engage the cam 21, and said roller is set within the inner portion of the resilient member 25$^a$ in about the same fashion that the roller 20 is set in the bearing member 24, in the forms of my invention first described, that is to say, the roller 20 has its ends shaped spherically and seated in sockets in the resilient member. The resilient member 25$^a$ is guided in the valve casing in substantially the same manner that the bearing member 24 is guided in the first form of my invention. The resilient member 25$^a$ may be of uniform height throughout its length, as shown, but its outer portion might be made of greater height (similar to the construction of the bearing member 24″ in Figs. 9 and 10) so as to engage the flange 41″ when the inlet valve moves inward beyond a certain point, thereby preventing the inlet valve from becoming detached as long as the washer 41 remains in position. The operation of this form of my invention will be practically the same as that of the first, so that repetition will be unnecessary.

Certain features of the constructions disclosed in the present application are also contained in my pending application Serial No. 652,476 filed July 19, 1923, and are claimed therein.

Various modifications may be made without departing from the nature of my invention as set forth in the appended claim.

I claim:

A device of the class described, comprising a casing having an inlet with an inwardly-facing valve seat, a cam journaled in said casing, and a valve controlling said inlet and governed by said cam, said valve consisting of a rolling member in engagement with said cam, a bearing member in which said rolling member is journaled, said bearing member having an outwardly-open socket, and a resilient member set in said socket and adapted to engage said valve seat, said resilient member being reversible end to end and having at opposite ends projections of different lengths one of which is in engagement with the end wall of said socket.

In testimony whereof I have hereunto set my hand.

GROVER S. EBLE.